A. W. WOOD.
BREAD CUTTER.
APPLICATION FILED SEPT. 28, 1916.
1,233,947.
Patented July 17, 1917.
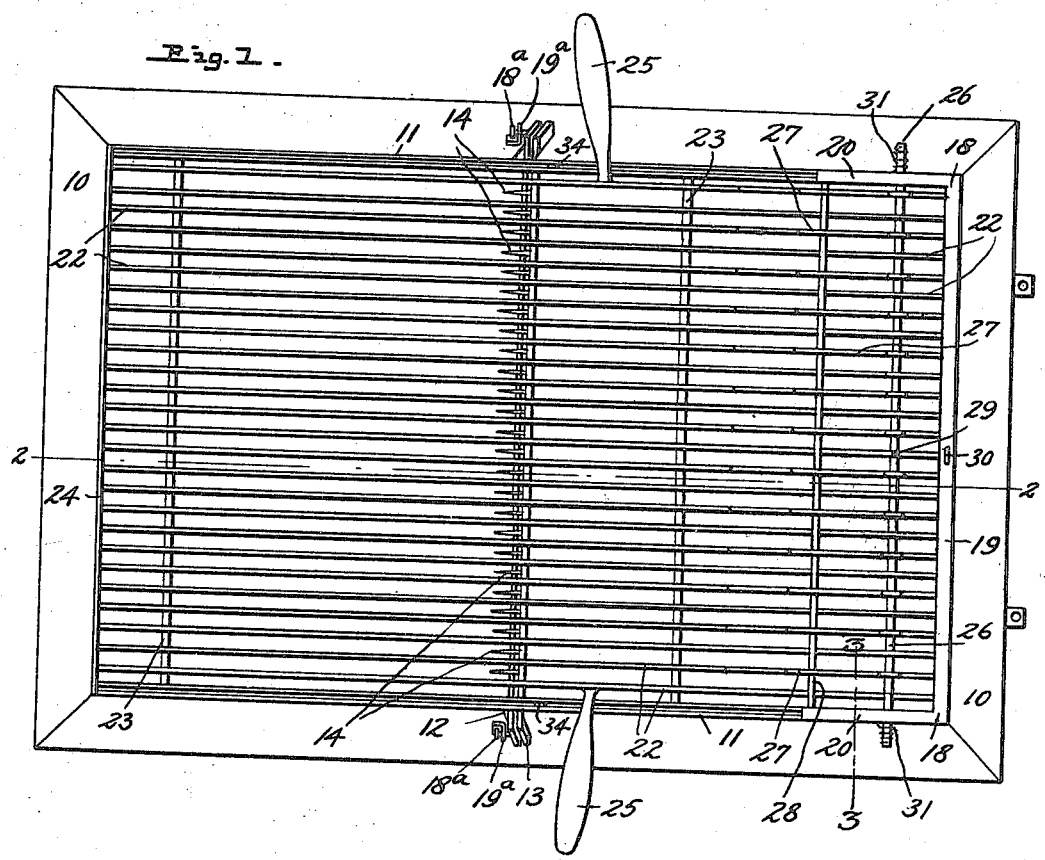
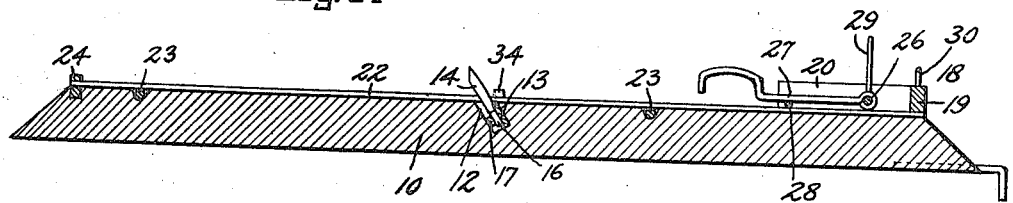
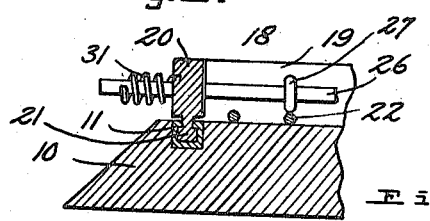
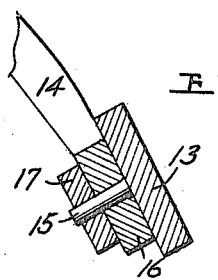
WITNESSES
INVENTOR
Augustus W. Wood.
ATTORNEY

UNITED STATES PATENT OFFICE.

AUGUSTUS W. WOOD, OF McKEEVER, NEW YORK.

BREAD-CUTTER.

1,233,947.　　　　Specification of Letters Patent.　　Patented July 17, 1917.

Application filed September 28, 1916.　Serial No. 122,676.

*To all whom it may concern:*

Be it known that I, AUGUSTUS W. WOOD, a citizen of the United States, residing at McKeever, in the county of Herkimer and State of New York, have invented certain new and useful Improvements in Bread-Cutters, of which the following is a specification.

This invention relates to bread cutters, and has for its object to provide a simple device of few parts, by means of which one or more loaves of bread may be cut into even slices by one operation of the device.

Another object of the invention is to provide a bread cutter having a flat face from which a plurality of knives project upwardly at a backward inclination, said knives being individually mounted on a supporting bar to permit removal when necessary for sharpening without disturbing the adjustment of the remaining knives. Furthermore, said knives are removable collectively to and from the base when such may be necessary without trouble to the operator.

A further object of the invention is to provide a bread cutter having a carrier movable longitudinally thereover formed of a plurality of parallel rods upon which the bread to be cut is placed and retained in position by suitable holders, and fixed knives for slicing the bread projected upwardly between said rods in position to engage the bread and cut the same from the bottom of the loaf upwardly, thus avoiding crushing the loaf which is so common when the operation of cutting is from above downwardly.

With the above as the principal objects in view, the invention consists of a construction, combination, and arrangement of parts hereinafter described, pointed out in the claims, and illustrated in the accompanying drawings, in which Figure 1 is a plan view of the bread cutter complete, Fig. 2 is a vertical longitudinal sectional view of the same on the line 2—2, Fig. 3 is an enlarged transverse sectional view of a portion of the device on the line 3—3 of Fig. 1, Fig. 4 is an enlarged cross sectional view through the knife support, and Fig. 5 is a view of a modification.

In the drawing, 10 indicates the base of the cutter preferably rectangular in plan view and of a plate or box like form as desired. In the top at each longitudinal side is inserted in a groove formed therein a slotted bar 11, said slot being undercut as shown in Fig. 3 for a purpose which is hereinafter set forth. About midway the length of the base and extending transversely thereof is a slot 12 inclined as shown to receive a bar 13 to which knives 14 are secured. The bar 13 is of a length sufficient to extend entirely across the base 10 and from one side of which bar projects a plurality of pins 15 spaced apart a distance equal to the width of the slices into which it is desired to cut a loaf of bread, and on each pin is placed the stock 16 of a knife 14. The pins for the knives project beyond the stocks 16 and through a plate 17, the latter serving to hold the knives on the pins, the whole fitting into the slot 12 in the base and held securely therein by a screw or bolt $18^a$ on each side of the base threaded into a bracket $19^a$ and bearing at its end on the end of the plate 17, serving to force the plate against the knives and the knives against the bar 13. The angle of the slot 12 is such that the knives 14 incline rearwardly at a suitable angle to give a shear cut when a loaf of bread is forced against them.

Slidable longitudinally on the base 10 is a bread carrier comprising a frame 18 formed of a transverse bar 19 and two short end projections 20 at right angles to the bar 19 supported upon the top of the grooved bars 11, the under sides of said projections having T-shaped ribs 21 to engage the undercut grooves in the bars 11 and prevent the frame 18 being removed or separated from the base during the operation of cutting a loaf of bread. Projecting forwardly from the transverse bar 19 of the frame 18 are a plurality of rods 22 lying parallel to each other and close against the upper surface of the base 10, said rods being supported by rollers 23 extending across the base and rotatable in grooves therein. There is a rod between each two knives 14 and one on the outside of each end knife, these rods being held at their outer or rear ends by a cross plate 24 secured to the base 10. A handle 25 extends from each side of the bread carrier to be grasped by the hands for moving said carrier longitudinally over the base 10.

Pivotally mounted in the projections 20 of the frame 18 is a transverse shaft 26 on which is fastened a plurality of bread holding fingers 27 preferably made of wire and bent at their outer and free ends to overlie and grasp a loaf of bread. These holding fingers which preferably are less in number than the rods 22 are secured to the shaft 26 vertically above certain of said rods so that when moved toward the knives they will pass between them and not interfere with the operation of cutting. The ends of the shaft 26 extend beyond the projections 20 and are each surrounded by a coil spring 31, one end of each spring being attached to the shaft and the other end to the projection 20, the tension of the springs being such as to hold the fingers in engagement with a loaf of bread. A cross wire 28 below the fingers and supported at its ends by the projections 20 prevent said fingers from bearing on the rods 22.

Projecting upwardly from the shaft 26 is a finger piece 29, by means of which the shaft is rocked, and the bread holding fingers 27 raised to permit the placing of a loaf of bread thereunder on the rods 22. When it is desired to hold the fingers in elevated position, the finger piece 29 is engaged with a hook 30 attached to the cross bar 19 of the frame 18.

In operating the bread cutter, the holding fingers 27 are raised by pressing rearwardly on the finger piece 29. A loaf of bread is then placed crosswise on the rods 22 and the fingers permitted to descend thereon being held on the bread with suitable pressure by the coil springs 31. The operator then grasps the handles 25 and pushes the carrier frame 18 toward the knives, which, as the loaf passes thereover, cut upwardly from the lower corner that first engages the knives to the top of the loaf, cutting the entire loaf into slices of equal width by one operation of the rearward movement of the bread carrier. The fingers 27 may now be lifted and the sliced loaf removed before retracting the carrier into position to receive another loaf of bread.

If desired, two or more loaves may be cut at the same operation by the use of fingers 32, see Fig. 5, having two or more loops 33 formed therein for engaging two or more loaves of bread. To prevent the bread carrier being moved too far when cutting a loaf of bread and causing injury to the knives by contact of the frame 18 therewith, stops 34 are secured on the bars 11 in rear of the knives against which the projections 20 of the frame 18 abut after a loaf of bread has passed the knives and been entirely cut into slices.

While I have shown and described what I consider the best form for this device, it is to be uderstood that various changes may be made in the construction and operation of the same without departing from the spirit of the invention and that such changes when so made are included in the scope of the appended claims.

What I claim is:

1. A bread cutter comprising a base, a bread carrier movable in a straight line over said base, a plurality of fixed knives mounted on the base and projecting upwardly therefrom at an angle, and means mounted on said carrier for holding a loaf of bread and also holding the slices after the loaf has been cut.

2. A bread cutter comprising a base, a plurality of spaced knives removably secured to said base and projecting upwardly from the top surface thereof at an inclination to said surface, a bread carrier movable in a straight line on said base to and from said knives, and means comprising a plurality of fingers for holding a loaf of bread on said carrier as the latter is moved toward the knives.

3. A bread cutter comprising a base having a flat top, a plurality of knives removably secured to said base and projecting upwardly at a backward inclination through the top thereof, and a bread carrier comprising a frame slidable over the top of the base toward and from said projecting knives, and a resilient bread holding means comprising a plurality of parallel fingers arranged to collectively hold a loaf of bread on said carrier as the latter is moved toward the knives and each to hold individually a slice of bread after the loaf has been cut.

4. A bread cutter comprising a flat base having a horizontal top, a transverse slot in said base opening through the top thereof, a plurality of removable knives mounted in said slot and projecting upwardly therethrough at a rearward inclination, a bread carrier comprising a frame and a plurality of parallel rods extending longitudinally of the base and between the knives, and a bread holding means for securing a loaf of bread on said rods to hold said loaf as the carrier is moved toward the knives.

5. A bread cutter comprising a base having a flat top, a transverse slot extending downwardly from the top, a plurality of removable knives seated in said slot and projecting upwardly through the top of the base, at a rearward inclination, a bread carrier slidable longitudinally along the top of said base and provided with a frame and a plurality of parallel longitudinal rods spaced apart and passing between said knives, rollers for the rods mounted in the base, and means for holding a loaf of bread on said rods as the carrier is moved toward the knives for slicing said loaf.

6. A bread cutter comprising a base having a flat top and a transverse slot extending downwardly from the top, a plurality of spaced knives projecting upwardly from the slot at a rearward inclination, a bar having a plurality of pins projecting from one side thereof, on each of which one of said knives is mounted, a plate bearing against said knives to hold them against the bar, and means on the base for fastening said plate and knives on the bar and the whole within said slot.

7. A bread cutter comprising a base and a plurality of knives projecting upwardly therefrom, a bread carrier slidable longitudinally over said base, the same including a frame, a plurality of parallel longitudinal rods secured to said frame, a plurality of bread fingers pivotally mounted on said frame, resilient means for holding said fingers in engagement with a loaf of bread on the bread carrier, and means for maintaining said fingers in elevated position.

In testimony whereof I affix my signature in presence of two witnesses.

AUGUSTUS W. WOOD.

Witnesses:
JAMES CAIRNS,
L. P. QUINN.

Copies of this patent may be obtained for five cents each, by addressing the "Commissioner of Patents, Washington, D. C."